United States Patent
Dosovitsky et al.

(10) Patent No.: US 9,906,452 B1
(45) Date of Patent: Feb. 27, 2018

(54) ASSISTING APPLICATION CLASSIFICATION USING PREDICTED SUBSCRIBER BEHAVIOR

(71) Applicant: F5 NETWORKS, INC., Seattle, WA (US)

(72) Inventors: Gennady Dosovitsky, Sunnyvale, CA (US); Dmitry Rovniaguin, Sunnyvale, CA (US); Amir Harush, San Jose, CA (US); Ron Talmor, Sunnyvale, CA (US); Dan Eliezer Karpati, Even-Yehuda (IL); Assaf Jacob Mendelson, Tel Aviv-Jaffa (IL)

(73) Assignee: F5 Networks, Inc., Seattle, WA (US)

( * ) Notice: Subject to any disclaimer, the term of this patent is extended or adjusted under 35 U.S.C. 154(b) by 236 days.

(21) Appl. No.: 14/290,458

(22) Filed: May 29, 2014

(51) Int. Cl.
*H04L 12/26* (2006.01)
*H04L 29/08* (2006.01)
(Continued)

(52) U.S. Cl.
CPC .......... *H04L 47/127* (2013.01); *H04L 41/147* (2013.01); *G06F 9/44505* (2013.01);
(Continued)

(58) Field of Classification Search
CPC ..... H04L 41/5067; H04L 47/20; H04L 63/20; H04L 65/70; H04L 67/14; H04L 67/141; H04L 67/32
See application file for complete search history.

(56) References Cited

U.S. PATENT DOCUMENTS 8,533,308 B1  9/2013  Rothstein
8,612,612 B1 * 12/2013  Dukes .................... H04L 67/14
                                              370/230
(Continued)

OTHER PUBLICATIONS

International Search Report and Written Opinion for International Application No. PCT/US2015/032077, dated Aug. 27, 2015, 11 pages.
(Continued)

*Primary Examiner* — Nicholas Taylor
*Assistant Examiner* — Ho Shiu
(74) *Attorney, Agent, or Firm* — John W. Branch; Lowe Graham Jones PLLC

(57) ABSTRACT

Embodiments are directed towards managing communication over a network assist application classification using predicted subscriber behavior. Subscriber information associated with a network flow may be determined. Prediction information that includes application identifiers may be generated based on the subscriber information. A classification engine may determine the applications associated with the network flow based on the prediction information and the network flow using a plurality of application classifiers that correspond to the applications.
If an application identifier included in the prediction information is correspondent to an application classifier, the application may be determined based on the correspondent application classifier; otherwise the application is determined based on the remainder of the application classifiers. A policy for managing the network flow may be determined based on the determined application. Then the network traffic associated with the network flow may be communicated based on the at least one determined policy.

24 Claims, 8 Drawing Sheets

(51) Int. Cl.

| | | |
|---|---|---|
| *H04L 9/08* | (2006.01) | |
| *G06F 15/16* | (2006.01) | |
| *G06F 9/445* | (2006.01) | |
| *G06F 15/177* | (2006.01) | |
| *G06F 9/46* | (2006.01) | |
| *G06F 9/54* | (2006.01) | |
| *H04L 12/801* | (2013.01) | |
| *H04L 12/24* | (2006.01) | |
| *H04L 12/859* | (2013.01) | |
| *H04L 12/851* | (2013.01) | |
| *H04L 12/813* | (2013.01) | |
| *G06F 15/78* | (2006.01) | |
| *G06F 9/50* | (2006.01) | |

(52) U.S. Cl.
CPC ........ *G06F 9/5066* (2013.01); *G06F 15/7871* (2013.01); *H04L 47/20* (2013.01); *H04L 47/2441* (2013.01); *H04L 47/2475* (2013.01)

(56) References Cited

U.S. PATENT DOCUMENTS

| | | | | |
|---|---|---|---|---|
| 8,619,799 B1* | 12/2013 | Thodupunoori | ...... | H04W 68/02 370/338 |
| 2003/0198204 A1* | 10/2003 | Taneja | ...... | H04L 5/023 370/332 |
| 2004/0153551 A1* | 8/2004 | Haumont | ...... | H04L 47/10 709/228 |
| 2007/0058632 A1* | 3/2007 | Back | ...... | H04L 12/2602 370/392 |
| 2009/0279701 A1* | 11/2009 | Moisand | ...... | H04L 12/185 380/270 |
| 2010/0309786 A1 | 12/2010 | Moisand et al. | | |
| 2011/0219035 A1* | 9/2011 | Korsunsky | ...... | G06F 17/30 707/784 |
| 2011/0238797 A1* | 9/2011 | Wee | ...... | G06F 9/44505 709/220 |
| 2013/0021906 A1 | 1/2013 | Rahman et al. | | |
| 2013/0263167 A1* | 10/2013 | Parthasarathy | ...... | H04L 41/5067 725/14 |
| 2014/0007202 A1 | 1/2014 | Zhao | | |
| 2014/0236873 A1* | 8/2014 | Viljoen | ...... | H04L 49/602 706/12 |
| 2014/0280898 A1* | 9/2014 | Voit | ...... | H04L 61/00 709/224 |
| 2014/0321290 A1* | 10/2014 | Jin | ...... | H04L 47/2441 370/241 |
| 2015/0105094 A1* | 4/2015 | Kotecha | ...... | H04W 24/02 455/452.2 |
| 2015/0186158 A1* | 7/2015 | Yalamanchili | ...... | G06F 9/44505 713/100 |

OTHER PUBLICATIONS

F5 Networks, "Big-IP Local Traffic Manager Concepts Version 11.2.1" https://support.f5.com/kb/en-us/products/big-ip_ltm/manuals/product/ltm-concepts-11-2-1.html, publication date Sep. 25, 2012, accessed on May 22, 2015 (377 pages).

F5 Networks, "Big-IP Local Traffic Manager: Implementations Version 11.2.1" https://support.f5.com/kb/en-us/products/big-ip_ltm/manuals/product/ltm-implementations-11-2-1.html, publication date Sep. 25, 2012, accessed on May 22, 2015 (272 pages).

\* cited by examiner

ASSISTING APPLICATION CLASSIFICATION USING PREDICTED SUBSCRIBER BEHAVIOR

TECHNICAL FIELD

The present invention relates generally to network traffic management and, more particularly, but not exclusively to methods for determining applications in network flows for network traffic management.

BACKGROUND

As businesses and people become more and more dependent on the availability of ubiquitous networks and network services, network traffic management systems have an increased responsibility for the safe, secure, and efficient allocation of network resources. Further, not only are network services becoming more available they are becoming more varied. Accordingly, network traffic management systems are often responsible for supporting many different types of network services and/or applications that are being utilized by many different types of users. In some cases, network traffic flows related to different applications and/or users may be processed under different network traffic management policies. Accordingly, network traffic management systems are often responsible for determining which application or service are being used or requested by a subscriber. Determining the application or service that is being used may be useful for applying the appropriate management policy to a given network flow. However, since the numbers of different types of applications continues to increase it is becoming increasing difficult to efficiently determine an application from the network traffic. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF VARIOUS EMBODIMENTS

Figure 1:
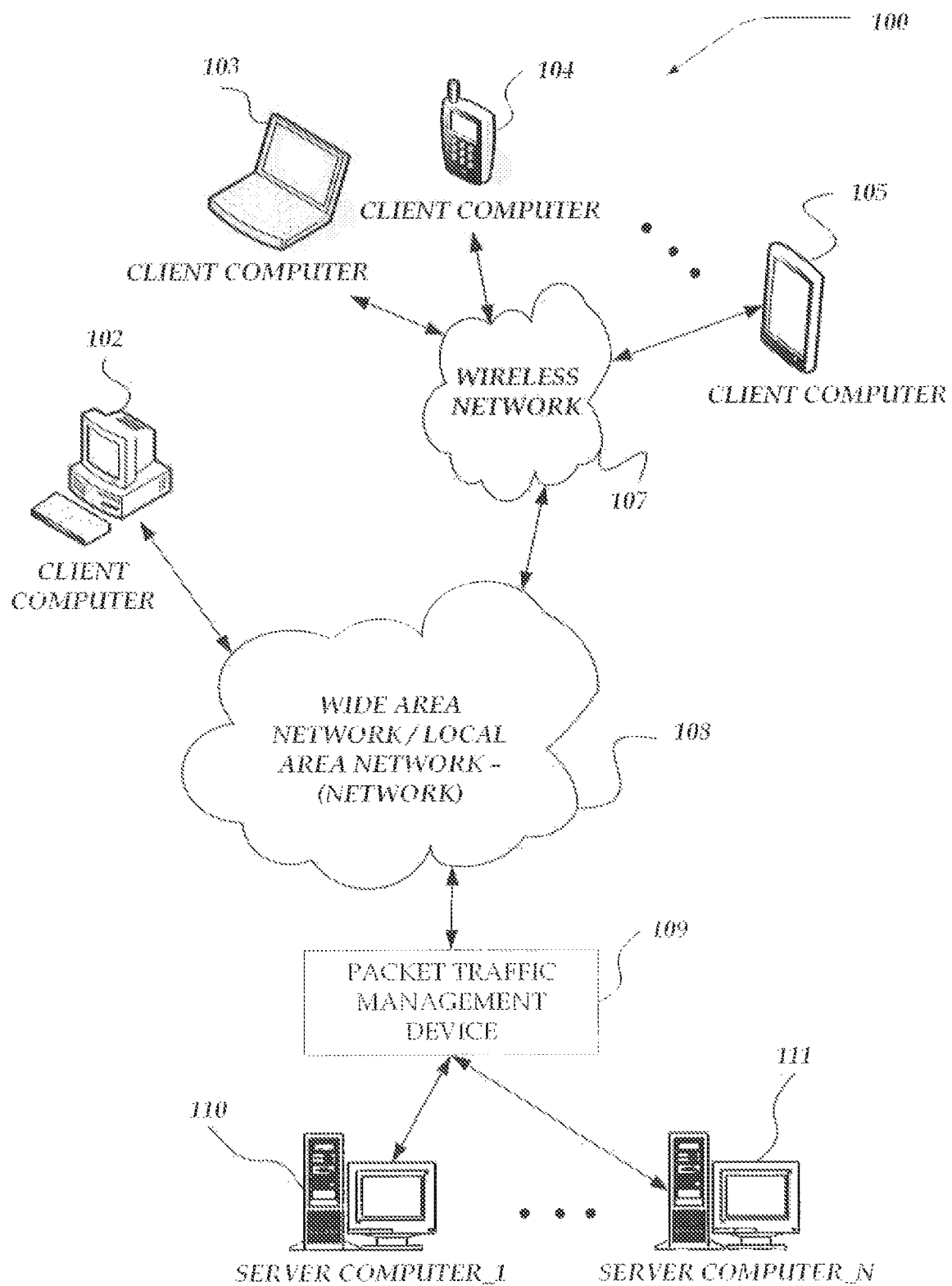
FIG. 1 is a system diagram of an environment in which embodiments of the invention may be implemented.

The present innovations now will be described more fully hereinafter with reference to the accompanying drawings, which form a part hereof, and which show, by way of illustration, specific embodiments by which the invention may be practiced. These innovations may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present innovations may be embodied as methods, computers, or devices. Accordingly, the present innovations may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the innovations may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "tuple" refers to a set of values that identify a source and destination of a connection. In one embodiment, a 5 tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to key that may be generated based on a tuple comprising any combination of fields selected from within a network packet header, including those fields identified above.

As used herein, the terms "network flow," "connection flow," "flow" may refer to a network session established between two endpoints. In at least one of the various embodiments, a tuple may describe the flow. In at least one of the various embodiments, flow control data associated with connection flows may be used to ensure that the network packets sent between the endpoints of a connection flow may be routed along the same path. In at least one of the various embodiments, the performance of connection oriented network protocols such as TCP/IP may be impaired if network packets may be routed using varying paths and/or directed different endpoints. Further, one or more protocol options may be associated with a flow enabling the endpoints to employ one or more features of the protocol that may be otherwise optional.

As used herein the terms "network destination," or "network address" refer to a name or number used to identify one or more items, objects, services, and/or locations in a communication network. In some cases, the network destination and/or network address may represent a single unique endpoint on the network. In other cases, the network destination and/or network address may represent of one or more endpoints each sharing one or more similar network communication attributes and/or characteristics. In at least one of the various embodiments, the elements that comprise tuples may be considered network destinations and/or components of a network destination. Also, network destinations may be defined using one or more sub-networking masks, wildcards, matching patterns, or the like. Network communication/monitoring/metrics may be directed to one or more network destinations.

As used herein the term "network traffic" refers to data and/or information that is communicated over a network flow. This information may be arranged according to the underlying network technology (e.g., Ethernet, Token Ring, ATM, or the like). Also, the information may be further arranged based on the network protocols (e.g., Transmission Control Protocol (TCP), User Datagram Protocol (UDP), Secure Shell (SSH), File Transfer Protocol (FTP), or the like) that are being used. Network traffic is often described in terms of packets, bytes, frames, streams, channels, or the like, depending on the applications and protocols being employed.

As used herein the term "policy rule" refers to conditions and actions that may be paired together such that if a condition is met then the corresponding action may be executed. In at least one of the various embodiments, conditions may be compound conditions comprised of multiple conditions. In at least one of the various embodiments, actions may also compound actions that include multiple actions may be associated with a condition and/or a policy rule. Policy rules may be arranged perform various network traffic management actions on network traffic, such as, load balancing, network flow steering, firewalling, modifying traffic data, enforcing security, caching, compression, decompression, cryptographic operations, proxying, traffic routing, traffic switching, bandwidth shaping, quota tracking, or the like. Also, some policy rules may be employed for determining pricing and rate plans for subscribers. Accordingly, policy rules may be employed for monitoring usage for computing charges for subscribers, enforcing usage quotas, or the like.

As used herein the term "policy" refers to a plurality of policy rules grouped together based on reasons, such as, semantic similarity, domain similarity, or the like. In at least one of the various embodiments, policy rules may be grouped into policies for any arbitrary reason to support the network management goals of a user/administrator of a traffic management device.

As used herein the term "policy engine" refers to a component of traffic management device that is arranged to process policy rules. In at least one of the various embodiments, a policy engine may be arranged to execute policy rules that are expressed in one or more computer programming languages, scripts, macros, configuration settings, or the like. Thus, in at least one of the various embodiments, expressions related to conditions and actions may execute by a policy engine.

As used herein the term "subscriber" refers to a user, person, or other entity that is associated with a one or more network flows that may be requesting access to applications or services that are under management by a network traffic management server. In some cases, information sufficient for identifying the subscriber may be included directly in the network traffic. In other cases, such information may be provided by external sources. Likewise, additional information associated with a subscriber may be stored locally on a network traffic manager or provided by one or more external sources upon request. Further, in some embodiments, subscribers may be associated with a mobile computer, such as, as a smart phone, tablet computer, or the like. Also, in some cases, subscribers may be associated with various computers, such as, network computers, client computers, smart televisions, set-top boxes, games consoles, or the like, or combination thereof. In some embodiments, subscribers may be grouped into various classes based on demographics, usage patterns, or the like, or combination thereof. Accordingly, in at least one of the various embodiments, subscriber information may be aggregated based on the subscriber class.

As used herein the term "application" refers to the tasks and/or services that may be associated with the network traffic in a network flow. As used herein, network traffic may be associated with high level applications, such as, a particular social network, a particular brand of search engine, a particular streaming media provider, a particular email service, a particular mobile computer application, a particular website/web service, or the like, or combination thereof. In other cases, applications may be defined to represent lower level concepts, such as, Hypertext Transfer Protocol (HTTP), Secure Shell (SSH), File Transfer Protocol (FTP), Internet Message Access Protocol (IMAP), Domain Name Service (DNS), or the like. Also, applications may be defined to represent media requests and/or transfers basal on Multipurpose Internet Mail Extensions (MIME) types, or the like. Further, in at least one of the various embodiments, applications may be arranged to represent particular transactions that may be carried in a network flow, such as, user logins, payment transactions, or the like.

As used herein the term "application group" refers to a collection of applications that have been determined to be related such that if network traffic one or more applications included in the group is discovered it is likely that other members of the application group may be appear soon.

As used herein the terms "classification engine," or "application classification engine" refer components of a network traffic management that may be arranged for determining one or more applications that may be associated with a network flow. Accordingly, classification engines may be arranged to employ various network traffic analysis techniques and decision trees for determining which applications are associated with a network flow. Classification engines may employ various methods for determining applications in a network flows, such as, pattern matching, lookup tables, customized scripts and/or rules, external information (e.g., prediction information), configuration information, or the like, or combination thereof.

As used herein the term "application classifier" refers to a one or more of the various analysis techniques and decision trees for determining which applications are associated with a network flow. Application classifiers may comprise one or methods for determining applications in a network flows, such as, pattern matching, lookup tables, customized scripts and/or rules, external information, configuration information, or the like, or combination thereof. In at least one of the various embodiments, application classifiers may be associated with particular applications or classes of applications.

As used herein the term "prediction information" refers to information that is provided to a classification engine to help optimize the process of determining which applications may be associated with a network flow. Prediction information may include one or more application identifiers for applications that have been predicted based on subscriber information behavior. In at least one of the various embodiments, prediction information may include scores that are associated with each application identifier such as a confidence level and/or priority value associated with the predicted application, or the like.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing communication over a network with a packet traffic management device (PTMD) that may be arranged to assist application classification using predicted subscriber behavior. In at least one of the various embodiments, subscriber information for one or more subscribers associated with a network flow may be determined. In at least one of the various embodiments, determining the subscriber information for the subscriber, may further include determining the subscriber information based in part on a separate communication with an external source, such as a Remote Authentication Dial In User Service (RADIUS) server.

In at least one of the various embodiments, prediction information may be generated that includes application identifiers. Also, in at least one of the various embodiments, generating the prediction information may further include, determining the prediction information based on historical information associated with the applications.

In at least one of the various embodiments, generating the prediction information, may further include, generating the prediction information based in part on including one or more application identifiers that may be defined using configuration information of the PTMD. In at least one of the various embodiments, the prediction information may further include, a quality score that may be based on factors, such as, a confidence value, a weight value, or the like.

In at least one of the various embodiments, a classification engine may be employed to determine one or more applications that may be associated with the network flow based on the prediction information and the network flow such that the classification engine provides at least one of a plurality of application classifiers that correspond to the applications.

In at least one of the various embodiments, if at least one application identifier included in the prediction information's is correspondent to the at least one application classifier, the application associated with the network flow may be determined based on the correspondent application classifier.

In at least one of the various embodiments, if the application identifiers included in the prediction information's are non-correspondent to the application classifiers, the application may be determined based on the remainder of the plurality of application classifiers.

In at least one of the various embodiments, applications that may be associated with the network flow may be determined by employing the application classifiers such that that application classifiers associated with the application identifiers included in the prediction information may be employed before the other application classifiers.

In at least one of the various embodiments, a policy for managing the network traffic that is associated with the network flow may be determined based on the at least one determined application. In at least one of the various embodiments, the network traffic that is associated with the network flow may be communicated based on the at least one determined policy. Furthermore in at least one of the various embodiments, the subscriber information may be updated based on the success or failure of the prediction information to predict the applications associated with the network flow.

Illustrative Operating Environment

FIG. 1 shows components of one embodiment of an environment in which the invention may be practiced. Not all of the components may be required to practice these innovations, and variations in the arrangement and type of the components may be made without departing from the spirit or scope of the invention.

As shown, system 100 of FIG. 1 includes local area networks ("LANs")/wide area networks ("WANs")—(network) 108, wireless network 107, client computers 102-105, packet traffic management device ("PTMD") 109, and server computers 110-111. Network 108 is in communication with and enables communication between client computers 102-105, wireless network 107, and PTMD 109. Wireless network 107 further enables communication with wireless devices, such as client computers 103-105. PTMD 109 is in communication with network 108 and server computers 110-111.

One embodiment of client computers 102-105 is described in more detail below in conjunction with FIG. 2. In one embodiment, at least some of client computers 102-105 may operate over wired and/or a wireless networks, such as networks 107 and/or 108. Generally, client computers 102-105 may include virtually any computing device, or computer capable of communicating over a network. It should be recognized that more or less client computers may be included within a system such as described herein, and embodiments are therefore not constrained by the number or type of client computers employed.

Computers that may operate as client computer 102 may include computers that typically connect using a wired or wireless communications medium, such as personal computers, servers, multiprocessor systems, microprocessor-based or programmable consumer electronics, network PCs, or the like. In some embodiments, client computers 102-105 may include virtually any portable computing computer, or computer, capable of connecting to another computing device, or computer and communicating information, such as laptop computers, smart phones, mobile computers, tablet computers, or the like. However, client computers are not so limited and may also include other portable devices, such as cellular telephones, display payers, radio frequency ("RF") devices, infrared ("IR") devices, Personal Digital Assistants ("PDAs"), wearable computers, integrated devices combining one or more of the preceding devices, and the like. As such, client computers 102-105 typically range widely in terms of capabilities and features. Moreover, client computers 102-105 may provide access to various computing applications, including a browser, or other web-based applications.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client computer may employ the browser application to perform various activities over a network (online). However, another application resident on the client computer may also be used to perform various online activities.

Client computers 102-105 also may include at least one other client application that is configured to communicate by receiving and/or sending data with one or more other computing devices and/or computers. The client application may include a capability to send and/or receive content, or the like. The client application may further provide information that identities itself, including a type, capability, name, or the like. In one embodiment, client computers 102-105 may uniquely identify themselves through any of a variety of mechanisms including a phone number, network address, MAC address, Mobile Identification Number ("MIN"), an electronic serial number ("ESN"), or other mobile device identifier. The information may also indicate a content format that the client computer is enabled to employ. Such information may be provided in a network packet, or the like, sent between other client computers, PTMD 109, server computers 110-111, or other computing devices.

Client computers 102-105 may further be configured to include a client application that enables an end-user to log into an end-user account that may be managed by another computer, such as server computers 110-111, or the like. Such end-user account, in one non-limiting example, may be configured to enable the end-user to manage one or more online activities and/or applications, including, search activities, social networking activities, browse various websites, communicate with other users, participate in gaming, interact with various applications, or the like. However, participation in some online activities may also be performed without logging into the end-user account.

Wireless network 107 is configured to couple client computers 103-105 and its components with network 108. Wireless network 107 may include any of a variety of wireless sub-networks that may further overlay stand-alone ad-hoc networks, and the like, to provide an infrastructure-oriented connection for client computers 102-105. Such sub-networks may include mesh networks, Wireless LAN ("WLAN") networks, cellular networks, and the like. In one embodiment, the system may include move than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile computers, such as client computers 103-105 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless network 107 may include virtually any wireless communication mechanism by which information may travel between client computers 103-105 and another computing device, computer, network, and the like.

Network 108 is configured to couple network computers with other computing devices, and/or computers, including, server computers 110-111 through PTMD 109, client computer 102, and client computers 103-105 through wireless network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lined, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"). wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices and/or computers.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of PTMD 109 is described in more detail below in conjunction with FIG. 3. Briefly, however, PTMD 109 may include virtually any network computer capable of managing network traffic between client computers 102-105 and server computers 110-111. Such computers include, for example, routers, proxies, firewalls, load balancers, cache devices, devices that perform network address translation, or the like, or any combination thereof. PTMD 109 may perform the operations of routing, translating, switching packets, network address translation, firewall services, network flow control, or the like. In one embodiment, PTMD 109 may inspect incoming network packets, and may perform an address translation, port translation, a packet sequence translation, and the like, and route the network packets based, at least in part, on the packet inspection. In some embodiments, PTMD 109 may perform load balancing operations to determine a server computer to direct a request. Such load balancing operations may be based on network traffic, network topology, capacity of a server, content requested, or other traffic distribution mechanisms.

Further, in at least one of the various embodiments, PTMD 109 may be arranged to discover and/or monitor subscriber and/or subscriber behavior. Also, PTMD 109 may be arranged to provision network resources for subscribers based on one or more policies associated with the subscriber.

In at least one of the various embodiments, PTMD 109 may be arranged to analyze network traffic for determining which applications may be associated with and/or included in a network flow. PTMD 109 may determine which policies to apply to a network flow based in part on the type of applications associated with the network flow and the subscribers that may be associated with a network flow. In at least one of the various embodiments, since there may be many potential applications, PTMD 109 may be arranged to employ other information, such as, historical subscriber behavior to assist in determining the applications that are associated with a network flow. In at least one of the various embodiments, historical subscriber behavior may provide a basis for generating predictions and/or hints that may be employed to shorten the time it takes PTMD 109 to determine which application may be associated with a given network flow.

PTMD 109 may include a control segment and a separate data flow segment. The control segment may include software-optimized operations that perform high-level control functions and per-flow policy enforcement for packet traffic management. In at least one of the various embodiments, the control segment may be configured to manage connection flows maintained at the data flow segment. In at least one of the embodiments, the control segment may provide instructions, such as, for example, a packet translation instruction, to the data flow segment to enable the data flow segment to route received packets to a server computer, such as server computer 110-111. The data flow segment may include hardware-optimized operations that perform statistics gathering, per-packet policy enforcement (e.g., packet address translations), high-speed flow caches, or the like, on connection flows maintained at DFS between client computers, such as client computers 102-105, and server computers, such as server computers 110-111.

Server computers 110-111 may include virtually any network computer that may operate as a website server. However, server computers 110-111 are not limited to website servers, and may also operate as messaging server, a File Transfer Protocol (FTP) server, a database server, content server, application server, or the like. Additionally, each of server computers 110-111 may be configured to perform a different operation. Computers that may operate as server computers 110-111 include various network computers, including, but not limited to personal computers, desktop computers, multiprocessor systems, microprocessor-based or programmable consumer electronics, network PCs, server computers, network appliances, and the like.

Although FIG. 1 illustrates server computers 110-111 as single computers, the invention is not so limited. For example, one or more functions of each of server computers 110-111 may be distributed across one or more distinct network computers. Moreover, server computers 110-111 are not limited to a particular configuration. Thus, in one embodiment, server computers 110-111 may contain a plurality of network computers that operate using a master/slave approach, where one of the plurality of network computers of server computers 110-111 operate to manage and/or otherwise coordinate operations of the other network computers. In other embodiments, the server computers 110-111 may operate as a plurality of network computers within a cluster architecture, a peer-to-peer architecture, a cloud architecture, or the like. Thus, the invention is not to be construed as being limited to a single environment, and other configurations, and architectures are also envisaged.

Illustrative Client Computer

Figure 2:
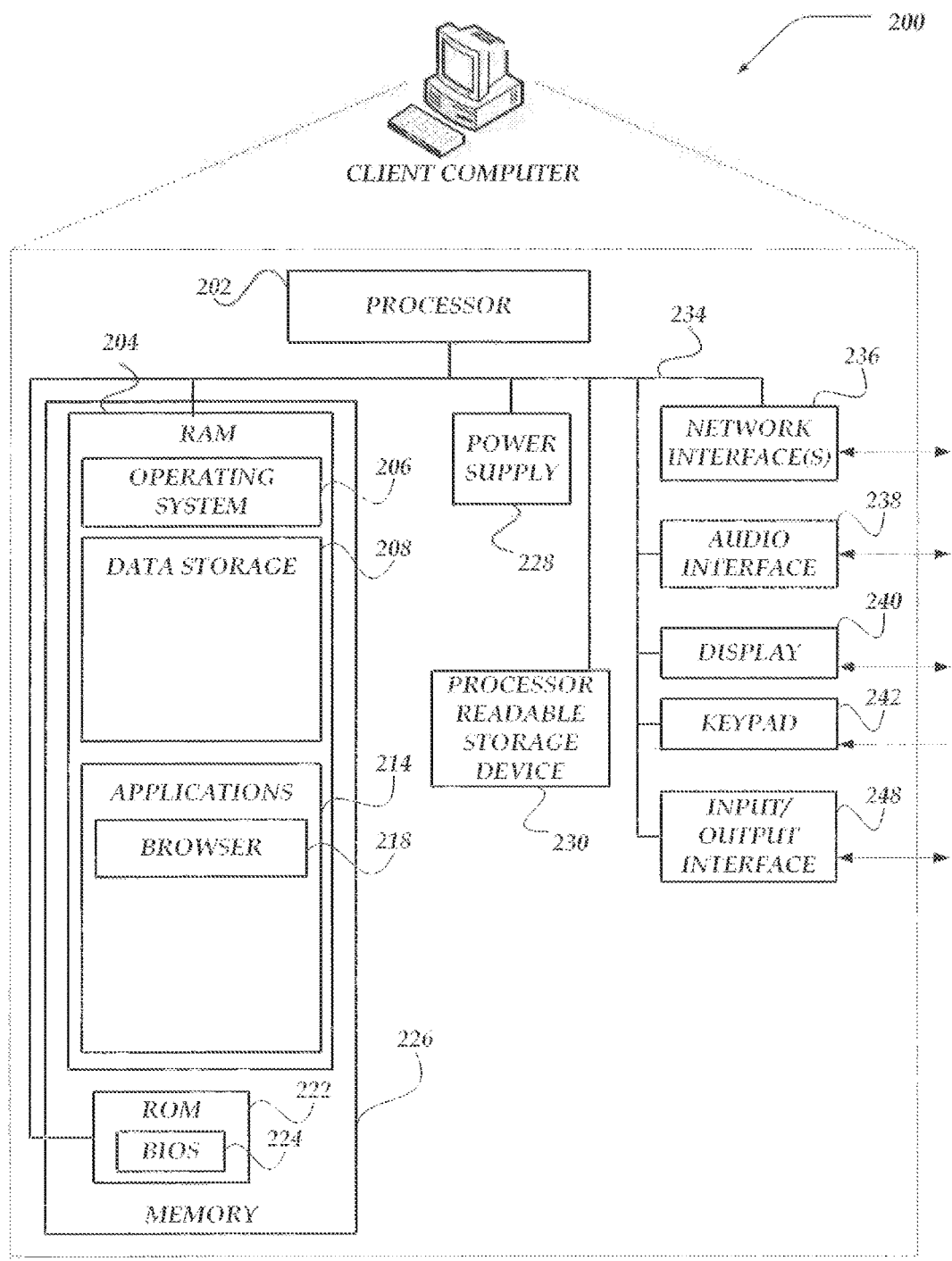
FIG. 2 shows an embodiment of a client computer that may be included in a system such as that shown in FIG. 1.

FIG. 2 shows one embodiment of client computer 200 that may be included in a system implementing embodiments of the invention. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with memory 226 via a bus 234. Client computer 200 also includes a power supply 228, one or more network interfaces 236, an audio interface 238, a display 240, a keypad 242, and an input/output interface 248.

Power supply 228 provides power to client computer 200. A rechargeable or non-rechargeable battery may be used to provide power. The power may also be provided by an external power source, such as an AC adapter or a powered docking cradle that supplements and/or recharges a battery. p Client computer 200 may optionally communicate with a base station (not shown), or directly with another computing device and/or computer. Network interface 236 includes circuitry for coupling client computer 200 to one or more networks, and is constructed for use with one or more communication protocols and technologies including, but not limited to, global system for mobile communication ("GSM"), code division multiple access ("CDMA"), time division multiple access ("TDMA"), High Speed Downlink Packet Access ("HSDPA"), Long Term Evolution ("LTE"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols.

Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computing device and/or computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Client computer 200 may also include a GPS transceiver (not shown) to determine the physical coordinates of client computer 200 on the surface of the Earth. A GPS transceiver typically outputs a location as latitude and longitude values. However, the GPS transceiver can also employ other geo-positioning mechanisms, including, but not limited to, tri-angulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client computer 200 on the surface of the Earth. It is understood that under different conditions, a GPS transceiver can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control ("MAC") address, IP address, or the like.

Memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another device or computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of network computer 200, including, but not limited to processor readable storage device 230, a disk drive or other computer readable storage medias (not shown) within client computer 200.

Processor readable storage device 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device and/or computer. Processor readable storage device 230 may also be referred to herein as computer readable storage media.

Applications 214 may include computer executable instructions which, when executed by client computer 200, transmit, receive, and/or otherwise process network data. Network data may include, but is not limited to, messages (e.g., SMS, Multimedia Message Service ("MMS"), instant message ("IM"), email, and/or other messages), audio, video, and enable telecommunication with another user of another client computer. Applications 214 may include, for example, browser 218. Applications 214 may include other applications, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as PTMD 109 and/or indirectly with server computers 110-111.

Illustrative Network Computer

Figure 3:
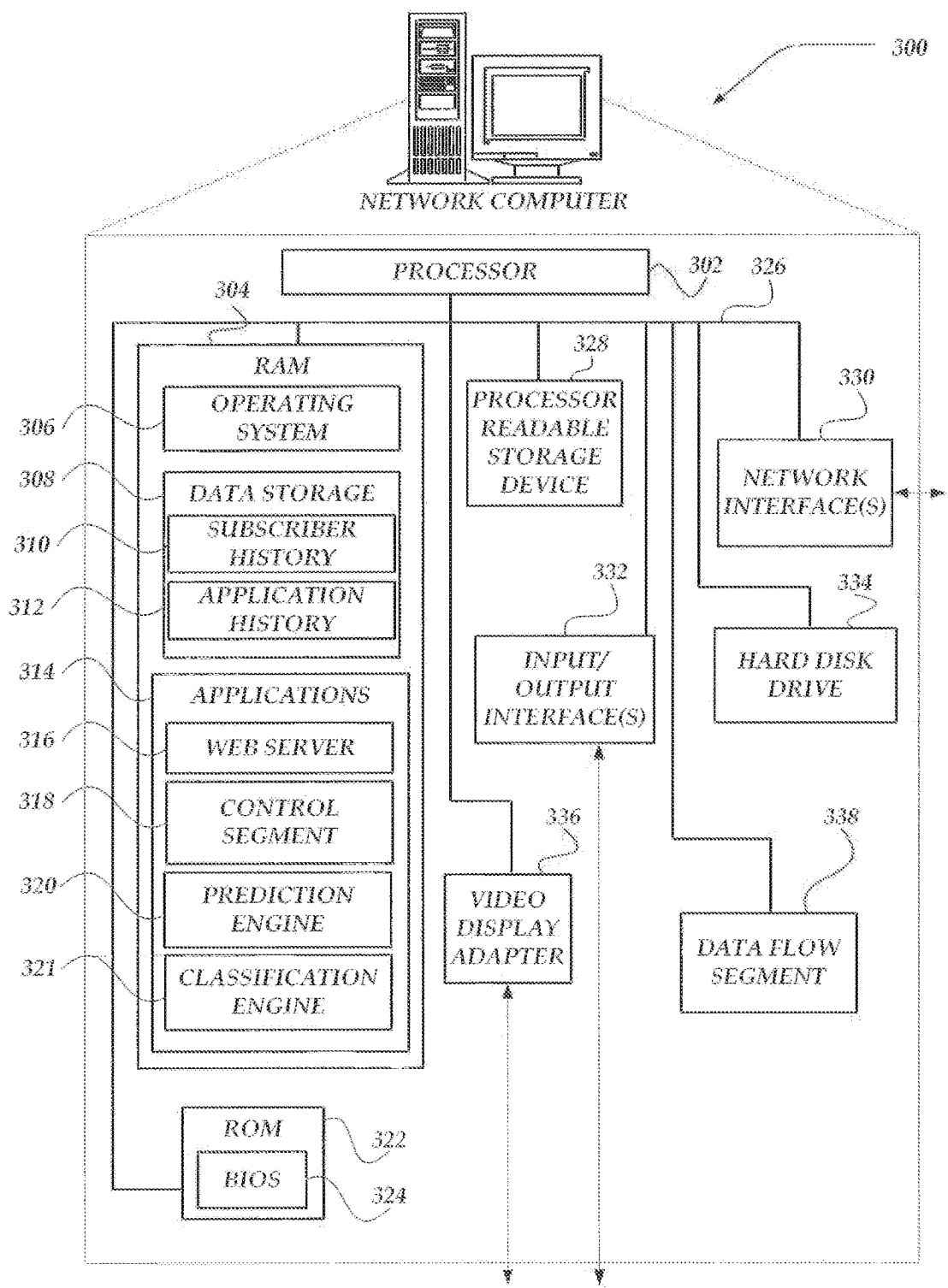
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other computer. Network computer 300 may represent, for example PTMD 109 of FIG. 1, server computers 110-111 of FIG. 1, and/or other network computers.

Network computer 300 includes processor 302, processor readable storage device 328, network interface unit 330, an input/output interface 332, hard disk drive 334, video display adapter 336, data flow segment ("DFS") 338 and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network computer 300. Any general-purpose operating system may be employed. Basic input-output system ("BIOS") 324 is also provided for controlling the low-level operation of network computer 300. As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer readable media, namely computer readable storage media and/or processor readable storage media, including processor readable storage device 328. Processor readable storage device 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device and/or computer.

Data storage 308 may include a database, text, spreadsheet, folder, file, or the like, that may be configured to maintain and store user account identifiers, user profiles, email addresses, IM addresses, and/or other network addresses, or the like. Data stores 308 may further include program code, data, algorithms, and the like, for use by a processor, such as central processing unit 302 to execute and perform actions. Also, in at least one of the various embodiments, data storage 308 may include, subscriber history 310 for storing information related to network flows, applications, or the like, associated with one or more subscribers or subscriber classes. Application history 312 may be arranged to contain information related to applications that may be tracked and/or monitored by a network traffic management device and/or network computer. In one embodiment, at least some of data store 308 might also be stored on another component of network computer 300, including, but not limited to processor-readable storage device 328, hard disk drive 334, or the like.

The mass memory may also stores program code and data. One or more applications 314 may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 316, control segment ("CS") 318, prediction engine 320, or classification engine 321 may also be included as application programs within applications 314.

Web server 316 represents any of a variety of services that are configured to provide content, including messages, over a network to another computing device and/or computer. Thus, web server 316 includes, for example, a web server, a File Transfer Protocol ("FTP") server, a database server, a content server, or the like. Web server 316 may provide the content including messages over the network using any of a variety of formats including, but not limited to WAP, HDML, WML, SGML, HTML, XML, Compact HTML ("cHTML"), Extensible HTML ("xHTML"), or the like. Web server 316 may also be configured to enable a user of a client computer, such as client computers 102-105 of FIG. 1, to browse websites, upload user data, or the like.

Network computer 300 may also include DFS 338 for maintaining connection flows between client computers, such as client computers 102-105 of FIG. 1, and server computers, such as server computers 110-111 of FIG. 1. In one embodiment, DFS 338 may include hardware-optimized operations for packet traffic management, such as repetitive operations associated with packet traffic management. For example, DFS 338 may perform statistics gathering, per-packet policy enforcement (e.g., packet address translations), or the like, on connection flows maintained at DFS 338. In some embodiments, DFS 338 may route, switch, forward, and/or otherwise direct packets based on policy rules for a particular connection flow signature (e.g., a 5 tuple of a received packet). Thus, DFS 338 may include capabilities and perform tasks such as that of a router, a switch, a routing switch, firewalls, network address translation, or the like. In some embodiments, the policy rules for a particular connection flow signature may be based on instructions received from CS 318. In one embodiment, DFS 338 may store the instructions received from CS 318 in a local memory as a table or some other data structure. In some other embodiments, DFS 338 may also store a flow state table to indicate a state of current connection flows maintained at DFS 338. In at least one of the various embodiments, components of DFS 338 may comprise and/or work in combination to provide high-speed flow caches for optimizing packet traffic management. In at least one of the various embodiments, CS 318 may provide connection updates to DFS 338 that may include activating or deactivating one or more protocol options for a particular connection flow, such as, turning on or off SYN-Cookie for TCP flows, or the like.

In some embodiments, DFS 338 may provide connection flow updates to CS 318. In one embodiment, a connection flow update may include a status of the connection flow, a current state of the connection flow, other statistical information regarding the connection flow, or the like. The connection flow update may also include an identifier that corresponds to the connection flow. The identifier may be generated and provided by CS 318 when a connection flow is established at DFS 338. In some embodiments, the connection flow update may be a connection flow delete update provided to CS 318 after the connection flow is terminated at DFS 338. The connection flow update and/or the connection flow delete update may be provided to CS 318 periodically, at predefined time intervals, or the like. In some embodiment, DFS 338 may stagger a time when a plurality of connection flow updates are provided to CS.

In some other embodiments, DFS 338 may include a plurality of data flow segments. In one non-limiting example, a first data flow segment within DFS 338 may forward packets received from a client computer to a server computer, while a second data flow segment within DFS 338 may forward and/or route packets received from a server computer to a client computer. In at least one of the various embodiments, DFS 338 may also be implemented in software.

In at least one of the various embodiments, DFS 338 may include different data paths, such as, active data paths or passive data paths. Active data paths may be optimized to support active policy rules. Passive data paths may be optimized to support passive policy rules.

CS 318 may include a control segment that may include software-optimized operations to perform high-level control functions and per-flow policy enforcement for packet traffic management. CS 318 may be configured to manage connection flows maintained at DFS 338. In one embodiments, CS 318 may provide instructions, such as, for example, a packet address translation instructions, to DFS 338 to enable DFS 338 to forward received packets to a server computer, such as server computer 110-111 of FIG. 1. In some other embodiments, CS 318 may forward and/or route packets between a client computer and a server computer independent of DFS 338.

In at least one of the various embodiments, CS 318 may include a plurality of control segments. In some embodiments, a plurality of control segments may access and/or manage connection flows at a single data flow segments and/or a plurality of data flow segments. In some other embodiments, CS 318 may include an internal data flow segment. In one such embodiment, the internal data flow segment of CS 318 may be distributed and/or separate from CS 318. For example, in one embodiment, CS 318 may be employed in software, while the internal data flow segment may be employed in hardware. In some other embodiments, CS 318 may identify if connection flows are split between different data flow segments and/or between a DFS 338 and CS 318. In at least one embodiment, CS 318 may also be implemented in hardware.

In at least one of the various embodiments, CS 318 may be configured to generate an identifier for each connection flow established at DFS 338. In some embodiments, CS 318 may utilize a sequence number of a SYN to generate an identifier for a corresponding connection flow. In one embodiment, the identifier may be based on a hash of the sequence number. In another embodiment, the identifier may be based on an exclusive OR byte operation of the sequence number. CS 318 may cache the identifier at CS 318 and may provide the identifier to DFS 338. In some embodiments, CS 318 may cache an identifier for each connection flow it establishes at DFS 338.

Illustrative Logical Architecture

Figure 4:
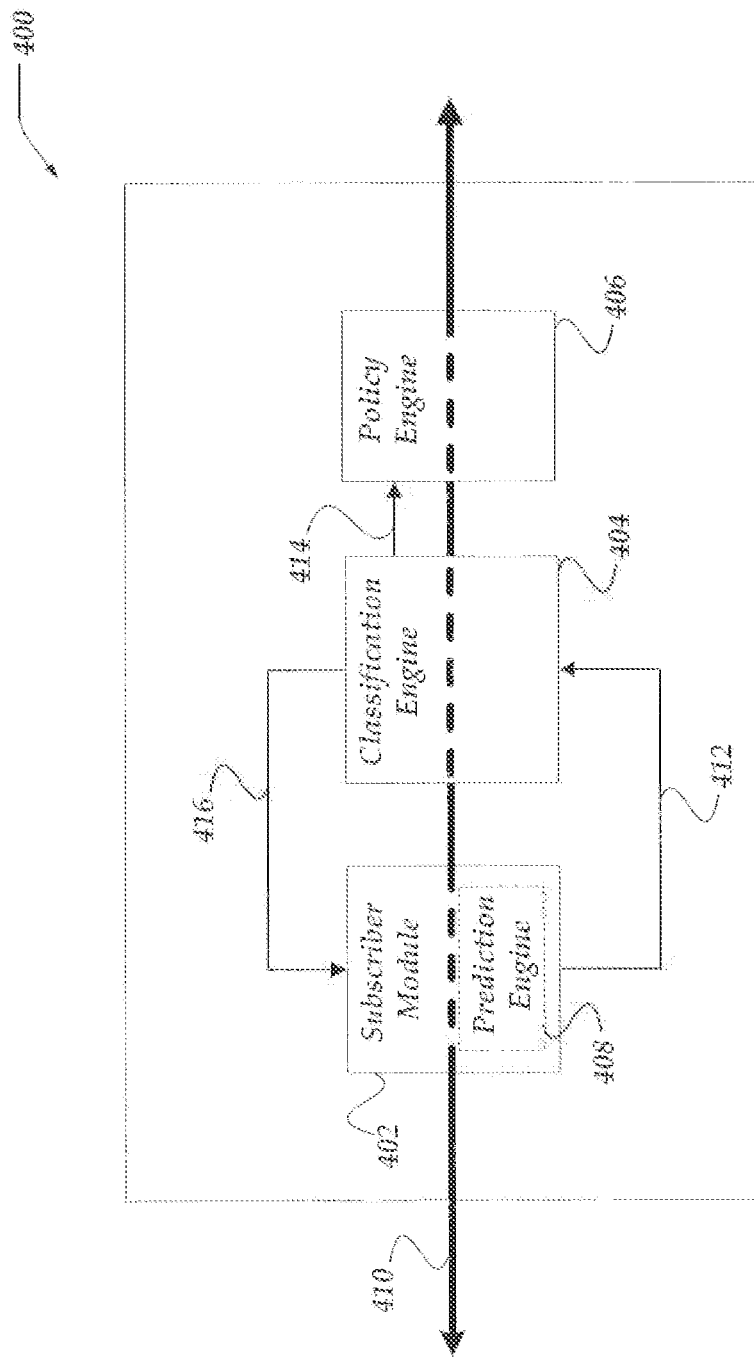
FIG. 4 shows a logical schematic for a system for predicting subscriber behavior for assisting application classification in accordance with at least one of the various embodiments.

FIG. 4 shows a logical schematic for system 400 for predicting subscriber behavior for assisting application classification in accordance with at least one of the various embodiments. In at least one of the various embodiments, system 400 may be a portion of a network traffic management device, such as, PTMD 109 and/or network computer 300. In at least one of the various embodiments, system 400 represents logical and/or physical components that may be arranged to perform one or more of the actions for the innovations disclosed herein. In other embodiments, there may be more or less components than as shown in FIG. 4. However, FIG. 4, read in view of the rest of this description, is at least sufficient to enable one of ordinary skill in art to understand and/or practice the innovations included herein.

In at least one of the various embodiments, system 400 may comprise, subscriber module 402, classification engine 404, policy engine 406, or the like. Also, in at least one of the various embodiments, subscribe module 402 may further comprise prediction engine 408.

In at least one of the various embodiments, one or more network flows, such as, network flow 410 may be provided to system 400. In at least one of the various embodiments, network flow 410 may be provided over a network, such as, network 108, wireless network 107, or the like, to a PTMD that includes system 400. Accordingly, in at least one of the various embodiments, network flow 410 may represent communication between and/or among client computers 102-105 and/or server computers 110-111, or the like, or combination thereof.

In at least one of the various embodiments, subscriber module 402 may be arranged to determine subscriber information for the subscribers that may be associated with provided network flows, such as network flow 410. In at least one of the various embodiments, subscriber information may be provided in the network traffic comprising network flow 410, or subscriber module 402 may communicate with other external components and/or sources such as, a Remote Authentication Dial In User Service (RADIUS) server, or the like, for obtaining information for determining which subscriber (if any) may be associated with the network flow. An example of subscriber information provided in the network traffic may include information, such as, Mobile Identification Number (MIN), source Internet Protocol (IP) address, Media Access Control (MAC) address, cryptographic user credentials, or the like, or combination thereof.

In at least one of the various embodiments, external information may be employed to confirm the identity of a subscriber, retrieve a subscriber identifier that may be associated with information included in the network traffic, or the like. Also, in at least one of the various embodiments, the external information may include subscriber policy information associated with a subscriber. In at least one of the various embodiments, subscriber policy information may also include information, such as, listing which applications may be accessible allowable to the subscriber.

In at least one of the various embodiments, prediction engine 408 may be arranged to employ current and/or historical subscriber information for predicting which application(s) may likely be associated with the network flow. Also, in at least one of the various embodiments, prediction engine 408 may be arranged to employ application history information as well for generating prediction information for predicting the applications that may be associated with a given network flow.

In at least one of the various embodiments, prediction engine 408 may be arranged to provide the prediction information (e.g., hints) to classification engine 404 over communication path 412. In at least one of the various embodiments, the prediction information may be inserted in the network traffic or otherwise provided in line with the network flow. Or, in at least one of the various embodiments, the prediction information may be provided out of band using an alternate communication path such as communication path 412.

In at least one of the various embodiments, classification engine 404 may be arranged to employ one or more application classifiers for determining the applications that are associated with a network flow. Application classifiers may comprise various analysis and/or decision making techniques may be employed for determining which applications are associated with a given network flow. For example, classification engines may be arranged to include application classifiers that employ various network traffic analysis and decision trees for determining which applications are associated with a network flow. In at least one of the various embodiments, one or more techniques may be employed for determining which applications may be associated with a network flow. In at least one of the various embodiments, application classifiers may comprise numerous tests and/or conditions that may be tried until the application is determined.

In at least one of the various embodiments, the classification engine may be arranged to employ prediction information provided by a prediction engine, such as, prediction engine 408. The prediction information may be employed to select which application classifiers, tests and/or conditions should be tried first. In at least one of the various embodiments, if the prediction information includes information that successfully predicts the applications associated with network flow, the time for determining which application is associated with the network flow may be significantly reduced. For example, in at least one of the various embodiments, if classification engine 404 is arranged to test for 1000 different applications, the prediction information may be employed to select which application classifiers to use first. Accordingly, in at least one of the various embodiments, if the prediction information accurately predicts which application is included in the network flow the associated application classifiers may be matched first avoiding many failed tests and/or unmatched application classifiers.

In at least one of the various embodiments, if the prediction information is inaccurate, classification engine 404 may fall back and employ its normal decision making process for selecting application classifiers for classifying the applications in the network flow.

In at least one of the various embodiments, after a classification engine determines the one or more applications in the network flow, policy engine 406 may be arranged to enforce one or more network management policies associated with the determined applications and/or subscriber. Accordingly, in at least one of the various embodiments, classification engine 404 may be arranged to include a facility, such as, communication path 414, for communicating application information to a policy engine, such as, policy engine 406.

Further, in at least one of the various embodiments, classification engine 404 may be arranged to provide feedback over a communication path, such as, communication path 416, that at least includes information regarding whether the prediction information was accurate. Also, in at least one of the various embodiments, a communication path, such as, communication path 416 may be employed for communicating information regarding which applications were determined to be associated with the network flow irrespective of prediction accuracy.

Accordingly, in at least one of the various embodiments, subscriber module 402 may be provided information regarding the applications determined to be associated with network flow 410 as well as the accuracy and/or effectiveness of the prediction information. In at least one of the various embodiments, this feedback from classification engine 404 may be incorporated if prediction information for subsequent network flows is generated.

Figure 5:
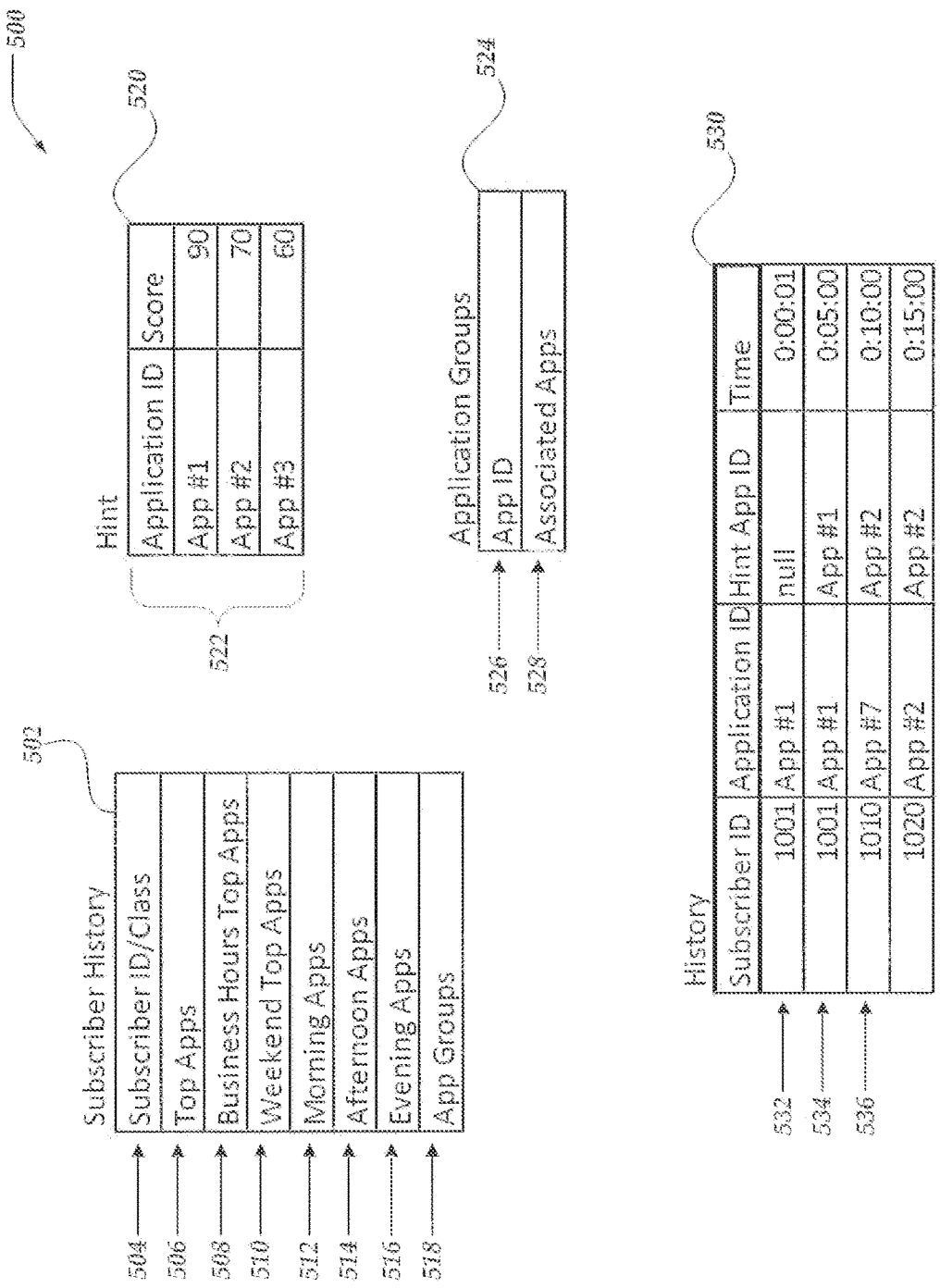
FIG. 5 illustrates data structures that may be employed by a prediction engine for generating prediction information in accordance with at least one of the various embodiments.

FIG. 5 illustrates data structures 500 that may be employed by a prediction engine for generating prediction information in accordance with at least one of the various embodiments. One of ordinary skill in the art will appreciate that more or fewer data structures may be employed. Also, it will be apparent to one of ordinary skill in the art that the various data structures may be arranged differently than as shown in FIG. 5. However, the data structures as illustrated in FIG. 5 are at least sufficient to enable one of ordinary skill in the art to understand and/or practice these innovations. Accordingly, in the interest of clarity and brevity FIG. 5 is limited to including these data structure representations.

In at least one of the various embodiments, data structure 502 may be arranged to include information for associating applications with a subscriber and/or a subscriber class. In at least one of the various embodiments, data structure 502 may include various fields and/or properties, such as, subscriber identifier or class identifier (field 504), a list of top (most used) applications for the subscriber (field 506), a list of the applications most used by the subscriber during business hours (field 508), a list of the applications most used by the subscriber during weekends (field 510), a list of the applications most used by the subscriber during morning hours (field 512), a list of the applications most used by the subscriber during afternoon hours (field 514), a list of the applications most used by the subscriber during evening hours (field 516), a list of the applications groupings most used by the subscriber (field 518), or the like. In at least one of the various embodiments, data structures for representing subscriber usage patterns may be arranged differently and/or have fewer or more fields than shown in data structure 502 and remain within the scope of these innovations.

In at least one of the various embodiments, data structure 520 may be arranged to include prediction information that may be provided to a classification engine. In at least one of the various embodiments, data structure 520 may be arranged to include a list of applications that are predicted to be associated with a network flow associated with a given subscriber. In this example, data structure 520 includes, list 522, that includes three application identifiers along with a corresponding score that may represent a confidence level of the prediction, or a quality score that may be computed based on factors, such as, a weight value, confidence level, configuration information, or the like, or combination thereof.

In at least one of the various embodiments, data structure 520 may include more or fewer applications, as well as, information in addition to a single score. Further, in at least one of the various embodiments, the application identifiers may be generated such that the classification engine may be able to associate the application identifier with one or more application classifiers comprising one or more classification rules/tests for determining applications that may be associated with a network flow.

In at least one of the various embodiments, data structure 524 may be arranged to include information for tracking application groupings. In at least one of the various embodiments, application grouping may be employed to develop historical information for tracking whether one or more different application may be related and/or associated with each other. In at least one of the various embodiments, application grouping information may be tracked on a per application basis independent of an individual user, or if may be tracked for an individual user.

In at least one of the various embodiments, application grouping information may be employed to capture the likelihood of one or more applications appearing in subsequent and/or related network flows. For example, in at least one of the various embodiments, a subscriber may habitually download email or text messages after logging on to a network. Accordingly, in at least one of the various embodiments, the prediction information may include applications that have been determined to be often accessed close in time together. Likewise, for example, a particular social network may be comprised of multiple applications, accordingly, some or all of the applications comprising the social network may be grouped together. Accordingly, in at least one of the various embodiments, if one application associated with a group is predicted, one or more of the group member applications may be included in the prediction information. In at least one of the various embodiments, data structure 524 may be arranged to associate one or more application identifiers (field 526) with one or more lists of associated applications (field 528).

In at least one of the various embodiments, data structure 530 may be arranged for including historical information for tracking and/or monitoring which applications are determined to be associated with a subscriber. In at least one of the various embodiments, as a classification engine, such as, classification engine 404 determines the applications that are associated with a network flow, it may provide, or otherwise make available, such information to a subscriber module, such as, subscriber module 402. Accordingly, in at least one of the various embodiments, subscriber module 402 may employ the information for tracking information, such as, subscriber history, application history, or the like.

In at least one of the various embodiments, in this example, data structure 530 may be arranged similar to a log file where information is recorded for each network flow that may be provided to the subscriber module. Also, in at least one of the various embodiments, data structure 530 may be arranged to capture feedback information provided by the classification engine. For example, data structure 530 includes columns for comparing the predicted application (Hint App ID) with the actual application (Application ID) as determined by the classification engine. Also, as shown in this non-limiting example, subscriber identifiers and date/time information may be recorded.

Accordingly, in at least one of the various embodiments, data structure 530 may be employed to determine the accuracy of past predictions as well as for generating new predictions. In this example, record 532 records that for subscriber 1001, the classification engine determined App #1 was associated with the flow at time 0:00:01. In record 532, the Hint App ID is set to null, which may indicate that the prediction engine did not provide any prediction information to the classification engine. Likewise, for this example, record 534 shows that subscriber 1001 is associated with a network flow that was determined to be associated with App #1 and the prediction information suggest App #1. However, for this example, record 536 shows that subscribe 1010 was associated with a network flow that was determined to be associated with App #7 while App #2 was the predicted application.

In at least one of the various embodiments, the information from data structure 502 may be employed to populate the fields in data structures, such as, data structure 502, data structure 524, or the like.

Generalized Operation

The operation of certain aspects of the invention will now be described with respect to FIGS. 6-8. In at least one of the various embodiments, processes 600, 700, and 800 described in conjunction with FIGS. 6-8, respectively, may be implemented by and/or executed on a network computer, such as network computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more client computers, such as client computer 200 as shown in FIG. 2. However, embodiments are not so limited and various combinations of network computers, or the like, may be utilized. Furthermore, in at least one of the various embodiments, processes 600, 700, and 800 may be arranged to employ portions of the logical schematics/architectures described in conjunction with FIG. 4 and FIG. 5.

Figure 6:
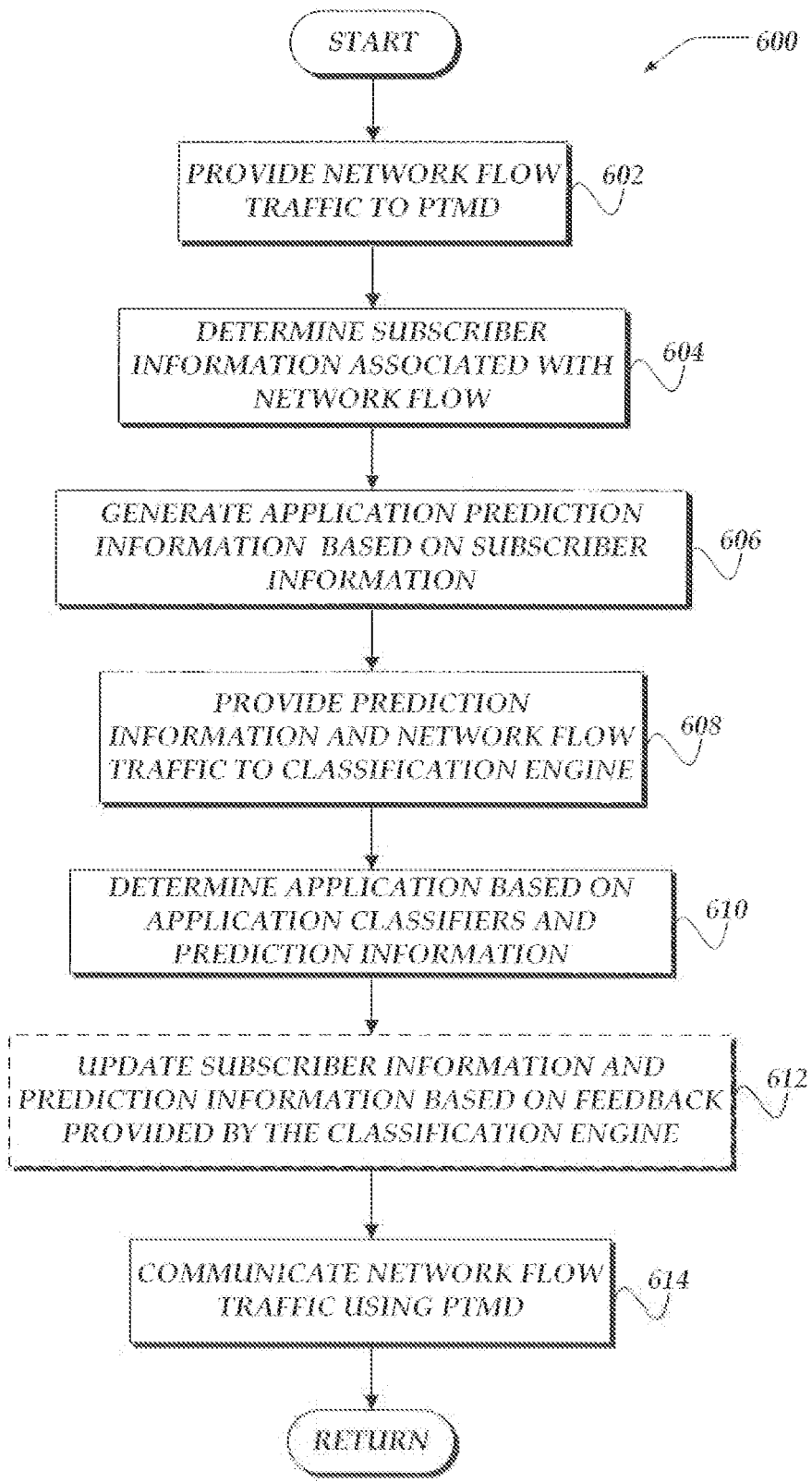
FIG. 6 shows an overview flowchart for a process for predicting subscriber behavior for assisting application classification, in accordance with at least one of the various embodiments.

FIG. 6 shows an overview flowchart for process 600 for predicting subscriber behavior for assisting application classification, in accordance with at least one of the various embodiments. After at start block, at block 602, in at least one of the various embodiments, network traffic for one or more network flows may be provided to a PTMD. In at least one of the various embodiments, a PTMD, such as, PTMD 109 may be arranged to manage network traffic that may be associated with various applications.

At block 604, in at least one of the various embodiments, subscriber information that may be associated with the network flow may be determined. In at least one of the various embodiments, one or more methods for determining a subscriber and/or subscriber class may be employed to determine the subscriber that may be associated with the network flow associated with the provided network traffic. See, FIG. 7 for further description.

At block 606, in at least one of the various embodiments, application prediction information may be generated based in part on the subscriber information. In at least one of the various embodiments, prediction information may be based on additional information and/or factors, such as, application groups.

In at least one of the various embodiments, configuration information may include information for determining prediction information. For example, if the PTMD is configured to only manage applications related to financial transactions, the prediction information may be arranged to reflect that such as applications may be likely, rather than, for example, streaming media or social network applications. In at least one of the various embodiments, prediction information may at least include one or more application identifiers corresponding to the predicted applications.

At block 608, in at least one of the various embodiments, the application prediction information along with the network flow traffic may be provided to a classification engine. As described in FIG. 4, the prediction information may be provided to a classification engine. In at least one of the various embodiments, the classification engine and the prediction engine may be arranged to be the same physical software and/or hardware component. However, at least logically the prediction information may be provided to a classification engine.

In at least one of the various embodiments, as discussed above the classification engine may be include one or more application classifiers that may be employed for determining the applications that may be associated with the network traffic that is associated with the network flow.

At block 610, in at least one of the various embodiments, the application associated with the network flow may be determined based on the network traffic and the prediction information. In at least one of the various embodiments, one or more application classifiers that may be employed by a classification engine for determining the applications associated with a network flow.

In at least one of the various embodiments, a classification engine included in the PTMD may employ the prediction information while determining which applications may be associated with the network flow. If the prediction information is accurate, it may enable the classification engine to short-circuit its normal process for determining applications, or otherwise reduce the time it takes to determine the applications that may be associated with a network flow. for example, if a classification engine is arranged to perform 1000 different tests for identifying up a 1000 different applications based on the composition of network traffic that is associated with a network flow, prediction information, if accurate may reduce the number of tests that need to be performed to determine the applications associated with a network flow. If the prediction information is not accurate, the classification engine may be arranged to fall back to its regular process for determining the applications that are associated with a network flow.

For example, in at least one of the various embodiments, if the prediction information suggests three likely applications, application classifiers associated with the three applications may be employed first. Accordingly, in this example, if the application classifiers determine that one or more of the included applications match the network traffic, the classification engine may avoid performing other tests associated with other application classifiers.

At block 612, optionally, in at least one of the various embodiments, the subscriber information and/or the prediction information employed by a prediction engine may be updated based on feedback provided by the classification engine. In at least one of the various embodiments, classification information, such as, which applications may have been determined to be associated with the network flow, may be provided to the subscriber module and/or the prediction engine to help improve the accuracy of future predictions.

At block 614, in at least one of the various embodiments, the network flow traffic may be communicated using the PTMD. In at least one of the various embodiments, the PTMD may be arranged to employ network management policies based on the applications that may be associated with network flows. For example, if a network flow includes streaming media for a particular media provider, the network traffic for that flow may be steered to and from server computers that are arranged to provide the media (e.g., streaming media server computers). Next, in at least one of the various embodiments, control may be returned to a calling process.

Figure 7:
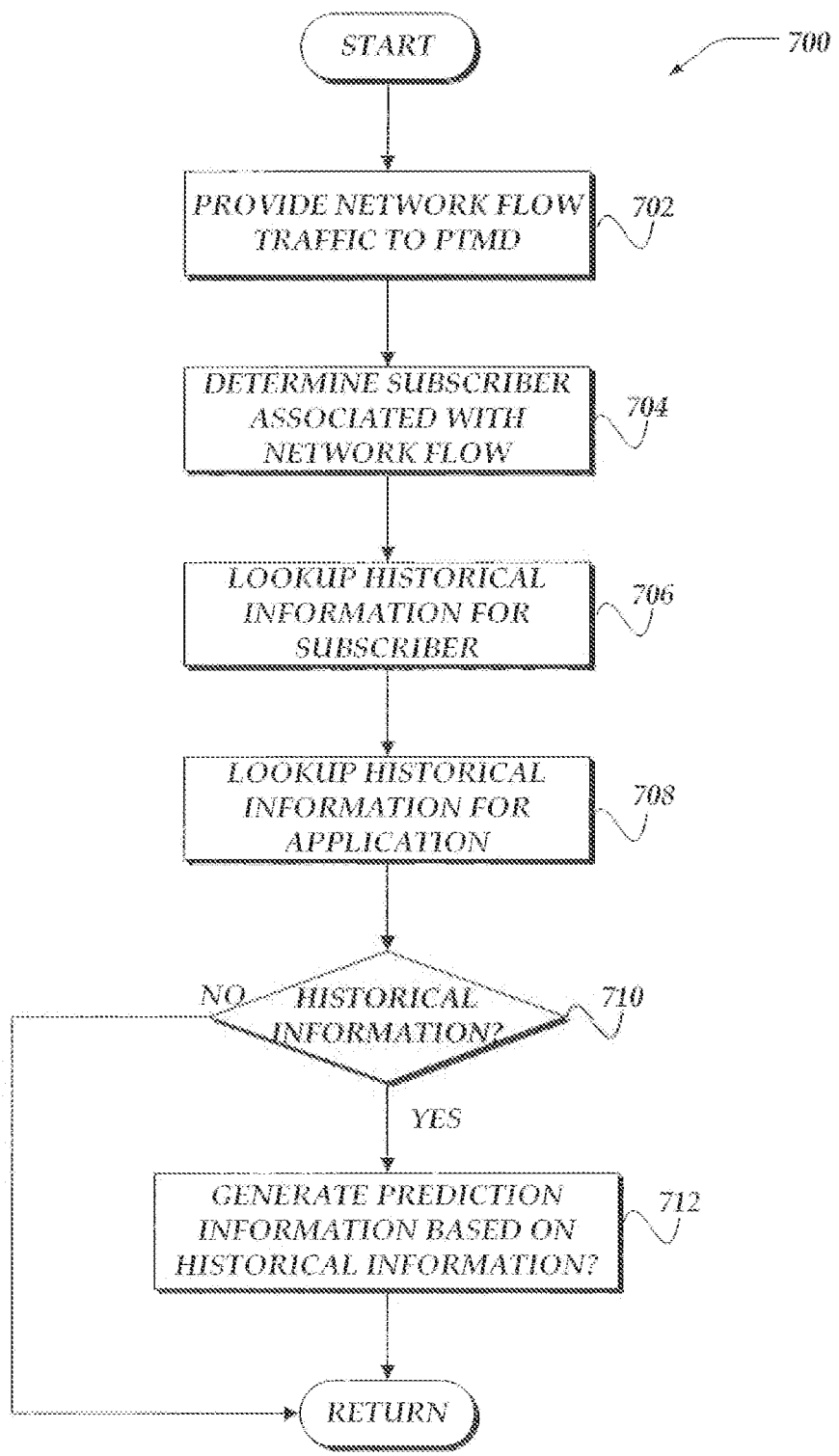
FIG. 7 shows an overview flowchart of a process for determining application prediction information in accordance with at least one of the various embodiments.

FIG. 7 shows an overview flowchart of process 700 for determining application prediction information in accordance with at least one of the various embodiments. After a start block, at block 702, network flow traffic may be provided to a PTMD. In at least one of the various embodiments, the PTMD may be arranged to include a subscriber module as described above.

At block 704, in at least one of the various embodiments, the subscriber associated with the network flow may be determined. In at least one of the various embodiments, the subscriber may be determined based on information included in the network flow. Or, in at least one of the various embodiments, the subscriber information may be provided in a separate transaction from an external source, such as, a RADIUS server. In other embodiments, the subscriber information may be included in configuration information that may associate the tuple information associated with network flow to individual subscribers and/or subscriber classes.

At block 706, in at least one of the various embodiments, historical information for the subscriber may be determined. In at least one of the various embodiments, the PTMD may be arranged to maintain historical information for a subscriber and/or subscriber classes. In some cases, the historical information for subscribers may be maintained indefinitely. In other cases, the information may be limited to relatively short-term buffer/caches for recently observed subscribers.

In at least one of the various embodiments, the historical subscriber information may take many forms and/or be arranged using various data structures. See, FIG. 5 and accompanying description.

At block 708, in at least one of the various embodiments, historical information for the applications may be determined. In at least one of the various embodiments, the PTMD may be arranged to maintain historical information for applications and/or application groups. In some cases, the historical information for applications may be maintained indefinitely. In other cases, the information may be limited to relatively short-term buffer/caches for recently observed applications.

In at least one of the various embodiments, application groups may be determined dynamically based on historical usage patterns. In at least one of the various embodiments, applications that consistently appear close in time together may be considered an application group. Accordingly, in at least one of the various embodiments, if one or more applications in a group has been discovered, the other applications in a group may be considered.

In at least one of the various embodiments, application groups may be based on pre-defined configuration information that may be provided by a user. For example, in at least one of the various embodiments, a user may have knowledge that application A is always closely followed by application B. Thus, for example, application A and application B may be included in an application group. Accordingly, in this example, if application A has been previously determined/discovered, application B may be included in the prediction information.

At decision block 710, in at least one of the various embodiments, if historical information associated with the subscriber and/or the applications is determined, control may flow to block 712; otherwise, control may be returned to another calling process. In at least one of the various embodiments, if the subscriber is unknown to the subscriber module or the subscriber module is unable to determine a subscriber, there may not be any historical information available. However, in some embodiments, there may be historical information associated with other factors, such as, tuple information of the network flow (e.g., source/destination addresses, port, VLAN number, or the like).

At block 712, in at least one of the various embodiments, prediction information may be generated based on the subscriber historical information. In at least one of the various embodiments, prediction information may be generated based on historical information associated with the subscriber and/or subscriber class. Also, in at least one of the various embodiments, prediction information may be generated based on application history (e.g., application group information).

In at least one of the various embodiments, prediction information may include providing a list of the last few applications that were determined to be associated with a given subscriber. In at least one of the various embodiments, prediction information may include quality scores, such as, confidence levels, weighting values, or the like.

In at least one of the various embodiments, weight values may be stored in configuration information. Accordingly, in at least one of the various embodiments, weight values may be reflects a user's knowledge of the likelihood of the occurrence of one or more applications. In at least one of the various embodiments, weights value may be applied to influence which applications are included in the prediction information. For example, applications with higher weight values may have a higher precedence than applications associated with lower weight values.

Further, in at least one of the various embodiments, configuration information pre-define one or more applications that may be tested before a classification engine's normal classification methods are application. Such configuration lists, may be sorted in rank order. Also, in at least one of the various embodiments, one or more applications may be listed to be test if the dynamically predicted application do not match. For example, in at least one of the various embodiments, PTMD may be configured such that a network flow is tested for App #7 after the test for each dynamically predicted application has failed.

In at least one of the various embodiments, if prediction information includes an application that is associated with an application group, one or more applications included in the group may be included in the prediction information.

In at least one of the various embodiments, configuration information may be defined for mapping/transforming the prediction information into a format that is compatible with a given classification engine. For example, in at least one of the various embodiments, the application identifiers employed by the prediction engine may be incompatible with a given classification engine. Accordingly, in at least one of the various embodiments, configuration information may be employed to determine application identifiers that may be compatible with the classification engine. Next, in at least one of the various embodiments, control may be returned to a calling process.

Figure 8:
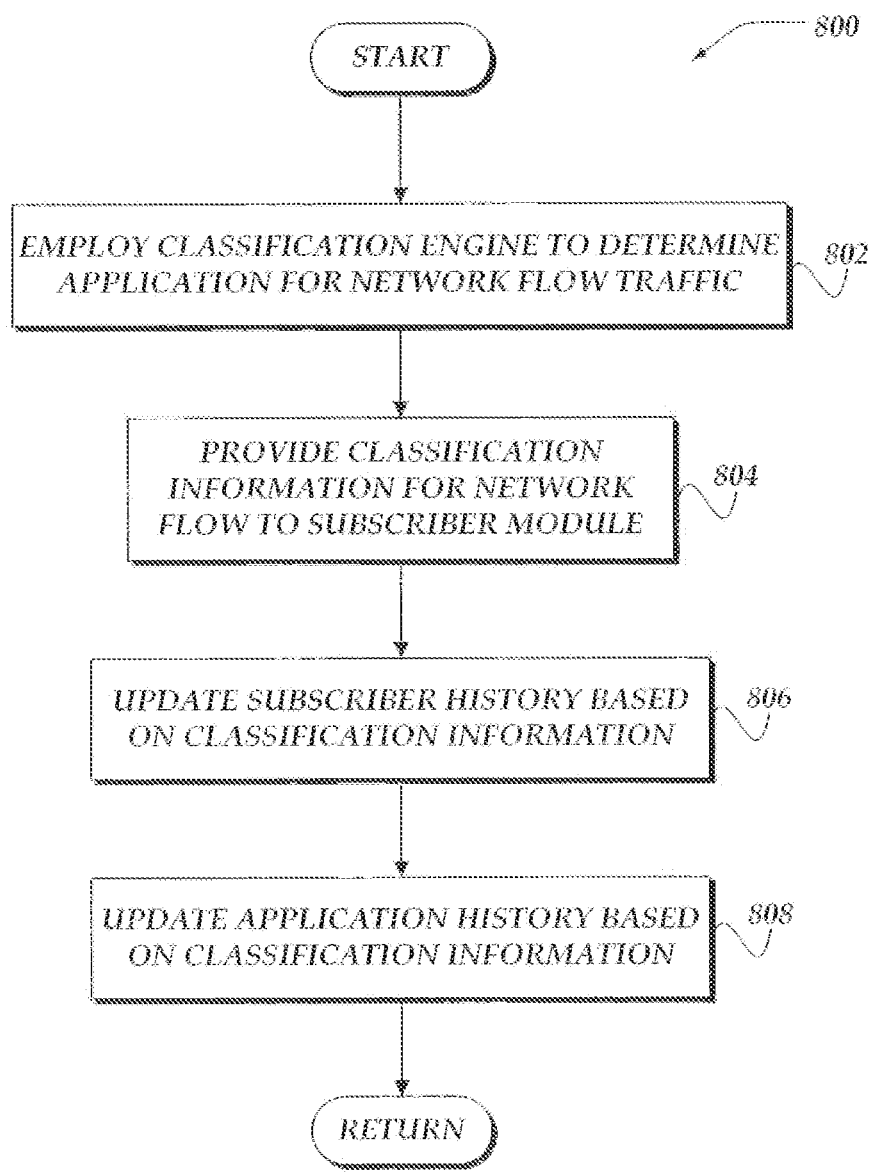
FIG. 8 shows an overview flowchart of a process for updating prediction information based on feedback from the classification engine in accordance with at least one the various embodiments.

FIG. 8 shows an overview flowchart of process 800 for updating prediction information based on feedback from the classification engine in accordance with at least one the various embodiments. After a start block, at block 802, in at least one of the various embodiments, a classification engine may be employed to determine the application that is associated with a network flow. In this block one or more embodiments of classification engines may be employed for determining the application that may be associated with a network flow. It may be assumed that prediction information may have been provided to the classification engine to help determine which applications may be associated with the network flow. However, for this block prediction information is not required nor is a successful prediction required. Classification engines may be assumed to be arranged to determine the applications with or without prediction information.

At block 804, in at least one of the various embodiments, the classification information associated with the network flow may be provided to a subscriber module included in a PTMD. In at least one of the various embodiments, the output of a classification engine is at least information indicating which applications were determined to be associated with a network flow. Accordingly, this information may be provided to a policy engine included in a PTMD for determining how the network traffic for the determined applications may be managed. In addition, this information may be provided to a subscriber module and/or a prediction engine included in a PTMD.

At block 806, in at least one of the various embodiments, the subscriber history for the subscriber associated with the network flow may be updated based on the provided classification information. In at least one of the various embodiments, the classification information may be recorded in a list and/or data structure, such as, data structure 530, or the like.

In at least one of the various embodiments, a prediction engine, such as, prediction engine 320, or another component of PTMD may be arranged to employ the information provided by the classification engine for updating the subscriber information that may be used by generating prediction information.

In at least one of the various embodiments, subscriber information may record a number (e.g., three) of the applications most recently associated with the subscriber. In other embodiments, the subscriber information may be more complex. In some cases, the application frequency for a subscriber may be computed based on time of day, day of week, or the like. Accordingly, in at least one of the various embodiments, the subscriber information may be updated as the classification engine reports the applications that have been determined to be associated with network flows associated with a subscriber.

At block 808, in at least one of the various embodiments, the application history for one or more of the applications associated with the network flow may be updated based on the provided classification information. In at least one of the various embodiments, a prediction engine or other component of a PTMD may be arranged to compute the frequency and/or tendency for certain applications to appear clustered and/or close-in-time.

In at least one of the various embodiments, applications that are observed to often occur in clusters for a subscriber and/or subscriber classes, may be identified as a group. Accordingly, if one member of the group is determined, the other applications included in the group may be predicted for subsequent network flows for the same subscriber and/or subscriber class. Also, in at least one of the various embodiments, if one member of a group is predicted, the other members may be included in the prediction information as well.

In at least one of the various embodiments, individual applications may be determined to be in a group if they are determined to be included in network flows that are provided within a pre-defined time/duration threshold for a subscriber and/or subscriber class. Also, in at least one of the various embodiments, applications may be determined to be in group if they regularly appear subsequent/concurrent to one or more other applications.

Further, in at least one of the various embodiments, application groups may be explicitly defined in configuration information. Likewise, in at least one of the various embodiments, one or more rules may be employed for determining how and when applications should be grouped to together. Next, in at least one of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing examples should not be construed as limiting and/or exhaustive, but rather, an illustrative use case to show an implementation of at least one of the various embodiments of the invention.

What is claimed as new and desired to be protected by Letters Patent of the United States is:

1. A method for managing communication over a network with a traffic management device (TMD) that includes one or more processor devices that execute instructions that perform actions, comprising:
    employing a subscriber module, by the one or more processor devices, to determine subscriber information for at least one subscriber that is associated with a network flow;
    employing a prediction engine, by the one or more processor devices, to generate prediction information based at least on the determined subscriber information, wherein the prediction information includes at least one application identifier;
    employing a classification engine, by the one or more processor devices, to determine at least one application associated with the network flow based on the prediction information and the network flow, wherein the classification engine provides at least one of a plurality of application classifiers that corresponds to the at least one application, and wherein the prediction information further includes one or more of a frequency of one or more applications to be instantiated or a tendency of two or more applications to be instantiated together close in time;
    in response to the tendency of two or more applications to be instantiated together close in time or included in network flows provided within a time threshold to the at least one subscriber, identifying the two or more applications as a group, wherein when a member of the group is subsequently included in the prediction information, each of the other members of the group are automatically included in the prediction information to improve efficiency;
    when the prediction information's at least one application identifier is correspondent to the at least one application classifier, employing the one or more processor devices to determine the at least one application based on the at least one correspondent application classifier;
    when the prediction information's at least one application identifier is non-correspondent to the at least one application classifier, employing the one or more processor devices to determine the at least one application based on at least one remainder of the plurality of application classifiers;
    employing a policy engine, by the one or more processor devices, to determine at least one policy for managing the network flow based on the at least one determined application, wherein at least historical information associated with the at least one determined application is updated based on provided classification information; and
    communicating the network flow to another entity based on the at least one determined policy.

2. The method of claim 1, further comprising, updating the subscriber information based on success of the prediction information to determine the at least one application.

3. The method of claim 1, wherein generating the prediction information, further comprises, determining the prediction information based on the at least historical information associated with the at least one determined application.

4. The method of claim 1, wherein the prediction information further comprises, a quality score that is based on at least one of a confidence value, or, a weight value.

5. The method of claim 1, wherein generating the prediction information, further comprises, generating the prediction information based in part on including one or more application identifiers that are defined by configuration information.

6. The method of claim 1, wherein determining the subscriber information for the at least one subscriber, further comprises, determining the subscriber information based in part on a separate communication with an external source.

7. A network computer for managing communication over a network, comprising:
    a transceiver for communicating over the network;
    a memory for storing at least instructions;
    one or more processor devices that are operative to execute instructions that enable operations, including:
        employing a subscriber module, by the one or more processor devices, to determine subscriber information for at least one subscriber that is associated with a network flow;
        employing a prediction engine, by the one or more processor devices, to generate prediction information based at least on the determined subscriber information, wherein the prediction information includes at least one application identifier;
        employing a classification engine, by the one or more processor devices, to determine at least one application associated with the network flow based on the prediction information and the network flow, wherein the classification engine provides at least one of a plurality of application classifiers that corresponds to the at least one application, and wherein the prediction information further includes one or more of a frequency of one or more applications to be instantiated or a tendency of two or more applications to be instantiated together close in time;
        in response to the tendency of two or more applications to be instantiated together close in time or included in network flows provided within a time threshold to the at least one subscriber, identifying the two or more applications as a group, wherein when a member of the group is subsequently included in the prediction information, each of the other members of the group are automatically included in the prediction information to improve efficiency;

when the prediction information's at least one application identifier is correspondent to the at least one application classifier, employing the one or more processor devices to determine the at least one application based on the at least one correspondent application classifier;

when the prediction information's at least one application identifier is non-correspondent to the at least one application classifier, employing the one or more processor devices to determine the at least one application based on at least one remainder of the plurality of application classifiers;

employing a policy engine, by the one or more processors device, to determine at least one policy for managing the network flow based on the at least one determined application, wherein at least historical information associated with the at least one determined application is updated based on provided classification information; and communicating the network flow to another entity based on the at least one determined policy.

8. The network computer of claim 7, wherein the network computer processor device is operative to enable actions, further comprising, updating the subscriber information based on success of the prediction information to determine the at least one application.

9. The network computer of claim 7, wherein generating the prediction information, further comprises, determining the prediction information based on the at least historical information associated with the at least one determined application.

10. The network computer of claim 7, wherein the prediction information further comprises, a quality score that is based on at least one of a confidence value, or, a weight value.

11. The network computer of claim 7, wherein generating the prediction information, further comprises, generating the prediction information based in part on including one or more application identifiers that are defined by configuration information.

12. The network computer of claim 7, wherein determining the subscriber information for the at least one subscriber, further comprises, determining the subscriber information based in part on a separate communication with an external source.

13. A processor readable non-transitive storage media that includes instructions for managing communication over a network, wherein a network computer includes one or more processor devices that execute at least a portion of the instructions enables operations, comprising:

employing a subscriber module, by the one or more processor devices, to determine subscriber information for at least one subscriber that is associated with a network flow;

employing a prediction engine, by the one or more processor devices, to generate prediction information based at least on the determined subscriber information, wherein the prediction information includes at least one application identifier;

employing a classification engine, by the one or more processor devices, to determine at least one application associated with the network flow based on the prediction information and the network flow, wherein the classification engine provides at least one of a plurality of application classifiers that corresponds to the at least one application, and wherein the prediction information further includes one or more of a frequency of one or more applications to be instantiated or a tendency of two or more applications to be instantiated together close in time;

in response to the tendency of two or more applications to be instantiated together close in time or included in network flows provided within a time threshold to the at least one subscriber, identifying the two or more applications as a group, wherein when a member of the group is subsequently included in the prediction information, each of the other members of the group are automatically included in the prediction information to improve efficiency;

when the prediction information's at least one application identifier is correspondent to the at least one application classifier, employing the one or more processor devices to determine the at least one application based on the at least one correspondent application classifier;

when the prediction information's at least one application identifier is non-correspondent to the at least one application classifier, employing the one or more processor devices to determine the at least one application based on at least one remainder of the plurality of application classifiers;

employing a policy engine, by the one or more processor devices, to determine at least one policy for managing the network flow based on the at least one determined application, wherein at least historical information associated with the at least one determined application is updated based on provided classification information; and communicating the network flow to another entity based on the at least one determined policy.

14. The media of claim 13, further comprising, updating the subscriber information based on success of the prediction information to determine the at least one application.

15. The media of claim 13, wherein generating the prediction information, further comprises, determining the prediction information based on the at least historical information associated with the at least one determined application.

16. The media of claim 13, wherein the prediction information further comprises, a quality score that is based on at least one of a confidence value, or, a weight value.

17. The media of claim 13, wherein generating the prediction information, further comprises, generating the prediction information based in part on including one or more application identifiers that are defined by configuration information.

18. The media of claim 13, wherein determining the subscriber information for the at least one subscriber, further comprises, determining the subscriber information based in part on a separate communication with an external source.

19. A system arranged for managing communication over a network, comprising:

a network computer, including:
a transceiver for communicating over the network;
a memory for storing at least instructions;
one or more processor devices that are operative to execute instructions that enable operations, including:
employing a subscriber module, by the one or more processor devices, to determine subscriber information for at least one subscriber that is associated with a network flow;

employing a prediction engine, by the one or more processor devices, to generate prediction information based at least on the determined subscriber information, wherein the prediction information includes at least one application identifier;

employing a classification engine, by the one or more processor devices, to determine at least one application associated with the network flow based on the prediction information and the network flow, wherein the classification engine provides at least one of a plurality of application classifiers that corresponds to the at least one application, and wherein the prediction information further includes one or more of a frequency of one or more applications to be instantiated or a tendency of two or more applications to be instantiated together close in time;

in response to the tendency of two or more applications to be instantiated together close in time or included in network flows provided within a time threshold to the at least one subscriber, identifying the two or more applications as a group, wherein when a member of the group is subsequently included in the prediction information, each of the other members of the group are automatically included in the prediction information to improve efficiency;

when the prediction information's at least one application identifier is correspondent to the at least one application classifier, employing the one or more processor devices to determine the at least one application based on the at least one correspondent application classifier;

when the prediction information's at least one application identifier is non-correspondent to the at least one application classifier, employing the one or more processor devices to determine the at least one application based on at least one remainder of the plurality of application classifiers;

employing a policy engine, by the one or more processors device, to determine at least one policy for managing the network flow based on the at least one determined application, wherein at least historical information associated with the at least one determined application is updated based on provided classification information; and communicating the network flow to another entity based on the at least one determined policy; and a client computer, comprising:
 a transceiver for communicating over the network;
 a memory for storing at least instructions;
 one or more processor devices that are operative to execute instructions that enable operations, including:
  providing network traffic from at least one network flow to the network computer.

20. The system of claim 19, wherein the network computer processor device is operative to enable actions, further comprising, updating the subscriber information based on success of the prediction information to determine the at least one application.

21. The system of claim 19, wherein generating the prediction information, further comprises, determining the prediction information based on the at least historical information associated with the at least one determined application.

22. The system of claim 19, wherein the prediction information further comprises, a quality score that is based on at least one of a confidence value, or, a weight value.

23. The system of claim 19, wherein generating the prediction information, further comprises, generating the prediction information based in part on including one or more application identifiers that are defined by configuration information.

24. The system of claim 19, wherein determining the subscriber information for the at least one subscriber, further comprises, determining the subscriber information based in part on a separate communication with an external source.

* * * * *